TRANSISTOR TESTING METHOD

Filed Dec. 31, 1957

INVENTORS
WILLIAM N. CARROLL
FRED E. HERDINA
BY Joseph J. Connerton
ATTORNEY

United States Patent Office 2,932,792

Patented Apr. 12, 1960

2,932,792

TRANSISTOR TESTING METHOD

William N. Carroll, Wappingers Falls, and Fred E. Herdina, Hyde Park, N.Y., assignors to International Business Machines Corporation, New York, N.Y., a corporation of New York Application December 31, 1957, Serial No. 706,369

8 Claims. (Cl. 324—158)

The present invention relates generally to the testing of semi-conductors and more particularly to a method for testing the pyramiding factor of a transistor used in voltage mode switching circuits.

To achieve high speed operation of transistor switching circuits operating in voltage mode, it was necessary to insert an "overdrive" capacitor across the input resistor to the base of the transistor to eliminate the turn-on and turn-off transition time of the transistor. Due to the number and varied load requirement of computer switching circuits, it became necessary to design general purpose circuits which could operate over a wide variety of load requirements. With standardization of such circuits, the load per driven circuit became a constant, but in many switching circuit applications numerous identical circuits were cascaded, thereby necessitating design of circuits capable of driving a number of similar circuits in parallel. In such switching circuits, the merit of a transistor is measured in its ability to switch capacitive loads rapidly. Thus for any load capacity and turn-on time, there is an optimum value of input capacity. Accordingly, the figure of merit for a given turn-on time in evaluating switching transistors was established as the ratio of load capacitance to input capacitance. This ratio, called the pyramiding or branching factor, can be interpreted as the maximum number of parallel circuit loads that the transistor can drive with a given turn-on time.

In view of the various types of transistors currently available, it became necessary to devise a method of evaluating the pyramiding factor of various types of transistors as well as individual transistors within a given type for transistor switching applications. Basically, the pyramiding ability of a transistor is primarily dependent on the frequency response and gain characteristics of the transistor being evaluated. While there is no available apparatus for directly indicating the gain characteristics of a transistor, since the gain $B=Ic/Ib$, the gain characteristics can be readily computed by measurements of the two variables at different values. To obtain the frequency response characteristics of transistors is a difficult and time consuming operation. However, even assuming the gain characteristics and frequency cut-off of a particular transistor are known, its relative driving ability within the group tested would be indicated, but there would be no indication of the exact branching or pyramiding factor.

In view of the above considerations, the need for a method for evaluating the pyramiding factor of individual transistors is apparent. The present invention is directed to a method for providing a direct measurement of the pyramiding ability of a transistor. The transistor to be evaluated is placed in a test circuit to simulate its intended environment, a signal of predetermined characteristics is coupled to the base of the transistor and the resulting output signal at the collector is adjusted until its duration equals the desired or permissable transient time. In the preferred embodiment herein described, the input signal applied to the transistor comprises a transient having a slope determined primarily by the operating speed of the circuit. The present invention is directed to a simple method of determining the pyramiding factor of a transistor to be used in a particular voltage mode switching circuit and as more fully described hereinafter, permits the selection of the value of input or overdrive capacitor which provides the maximum pyramiding factor for a given turn-on time.

Accordingly, a primary object of the present invention is to provide a method for measuring the pyramiding factor of a transistor.

Another object of the present invention is to provide a method for determining the optimum value of input capacitance for voltage mode switching circuits.

Still another object of the present invention is to provide a method for evaluating the pyramiding factor of a transistor operated in a common emitter configuration.

Other objects of the invention will be pointed out in the following description and claims and illustrated in the accompanying drawings, which disclose, by way of example, the principle of the invention and the best mode, which has been contemplated, of applying that principle.

In high speed switching circuits operating in voltage mode, the major portion of loads to be driven are capacitive and consists of the input capacity of the driven circuit or circuits and the stray capacity of the load. In most circuits the stray capacity of the load is sufficiently small, relative to the input capacity, that it can be ignored. However, the selection of a value of input capacity in a standardized switching circuit involves several conflicting considerations. As the input capacity is increased, the rise or fall time of the output signal or transient is decreased. However, since the load capacity is proportional to the number of circuits to be driven, the increased capacitance of the load tends to slow the rise and fall time of the output signal or transient. Thus for any particular set of operational parameters there is an optimum value of input capacitance which will provide the maximum pyramiding ability of the transistor for the frequency of the circuit under test.

Figure 1:
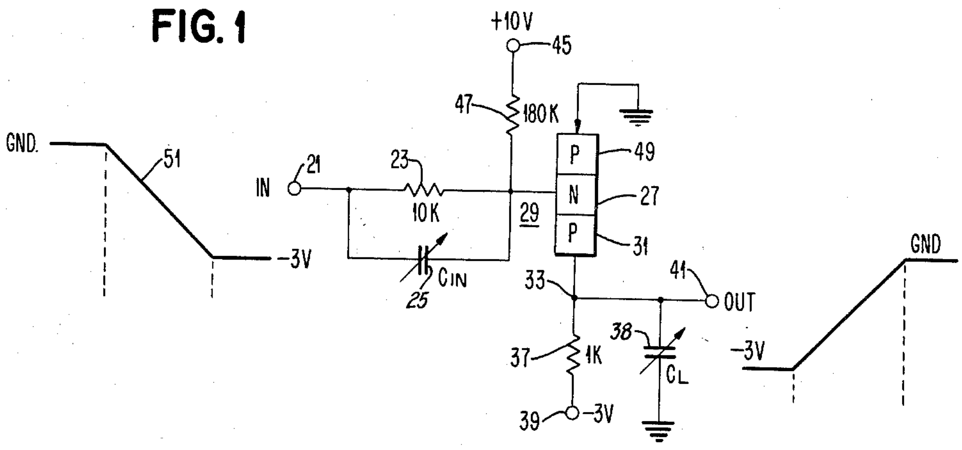
Fig. 1 illustrates in schematic form a preferred embodiment of the present invention.

Referring now to Fig. 1 there is illustrated in schematic form the circuit used to evaluate the pyramiding factor of a transistor under test. The circuit herein illustrated as exemplary of the present invention is a grounded emitter circuit operating in a voltage mode of operation. The subject invention utilizes a PNP type transistor which when connected in a common or grounded emitter configuration operates as an inverter. The terms common emitter and grounded emitter are synonymous and do not relate to a particular signal level but merely signify that the collector is negative with respect to the emitter. The input circuit comprising input terminal 21, resistor 23 and capacitor 25 is connected to the base terminal 27 of the test transistor 29. The output circuit connected to collector terminal 31 comprises output terminal 33, collector load resistor 37, load simulating capacitor 38, negative supply terminal 39 and output terminal 41. Bias to the base of the transistor is provided by power supply terminal 45 through resistor 47 and input terminal 21 through resistor 23, while the transistor emitter terminal 49 is grounded. The circuit operates in the following manner: An input signal transient which in the preferred embodiment comprises a negative transient indicated by curve 51 is applied through input terminal 21, resistor 23 and capacitor 25 to the base terminal 27 of transistor 29. While the signal source is not considered an element of or necessary for an understanding of the present invention, the input signal could be provided by a conventional square wave generator having a known fall time. This negative signal turns transistor 29 on, resulting in a rise in the voltage at collector terminal 31. The slope of the output signal at the collector is controlled by the variable load simulating capacitor 38, which is varied until the transient time of the output signal equals that of the input or some other desired time. The pyramiding factor ratio of load to input capacitance will then be recorded as a function of the input capacitance. The above described test will then be repeated for another value of input capacitance, the same input signal applied and the load capacitor adjusted to provide the same output transient as above. This operation is repeated for different values of input capacitance until a locus of points is obtained, each point designating the pyramiding factor of the transistor for a particular value of input capacitance.

Figure 2:
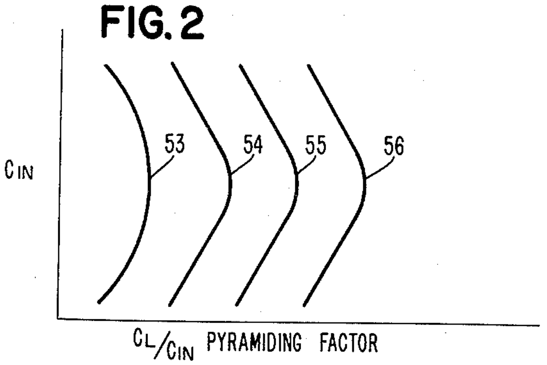
Fig. 2 is a family of curves indicating the pyramiding factor variation versus input capacitance for varying durations of the output signal and a constant duration input signal.

Referring briefly to Fig. 2, there is shown a family of curves 53—56 designating the test results for a single transistor, i.e., the variation of the pyramiding factor as a function of the input capacitance for different output transient times for a constant duration input signal. From an analysis of the curves, it is apparent that as the output transient time of the signal is allowed to increase, the pyramiding factor increases in the manner shown. This indicates that while the pyramiding factor of a particular transistor may be satisfactory for one transient duration, it might be unsatisfactory where the required duration of the output signal is shorter. Generally speaking, the better the pyramiding factor for any value of input capacitance, the higher the frequency response of the transistor under test. Thus the pyramiding factor test may also be used for indicating the frequency response of the transistor under test. In selecting a transistor for a particular application, the maximum ouput transition time which can be tolerated will determine whether the particular transistor will be satisfactory insofar as its pyramiding ability is concerned.

A test of the pyramiding factor for a particular application might also be performed on a "Go," "No-Go" basis in which the value of input capacity will be fixed as well as the duration of the input transition. The transistor would then be accepted or rejected on the basis of the output rise time. For example, if a 30 millimicrosecond transition was applied to the input terminal 21 for a specified value of input capacitance 25, the transistor might be accepted where the output signal is equal to 30 millimicroseconds or less, and those having a longer duration time rejected.

Figure 3:
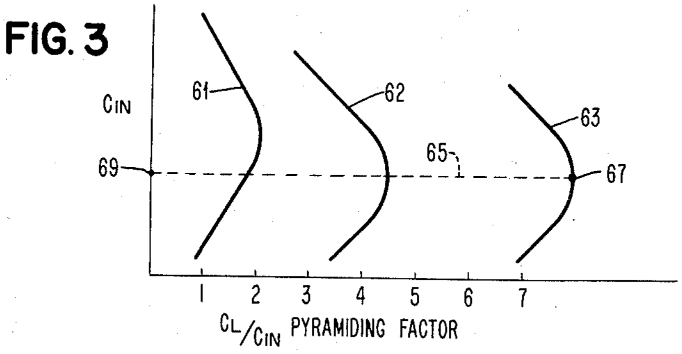
Fig. 3 is a family of curves illustrating the pyramiding factor variation versus input capacitance for several types of transistors having the same input and output signal.

Referring now to Fig. 3, there is illustrated a family of curves designating the variation in pyramiding factor versus input capacitance for several transistor types under identical values of input and output transitions. With respect to the first transistor characteristics identified by curve 61, it is apparent that the pyramiding factor is low for any value of input capacitance and this type transistor would be unsatisfactory for switching circuit application. The next curve 62 designating the pyramiding ability of a second type transistor, while better than that of the transistor identified by curve 61 would still be unsatisfactory for general purpose computer application since the maximum pyramiding factor of the transistor is less than 5. The third transistor identified by curve 63 provides a satisfactory pyramiding factor for general purpose computer applications. The maximum pyramiding factor of the transistor is slightly greater than 8 which is satisfactory for general purpose switching circuits, and the corresponding value of input capacitance for the maximum pyramiding factor would be determined by extending dotted line 65 from point 67 of the maximum pyramiding factor to point 69 on the ordinate of the curve. The value of the input capacitance would then be indicated from the scale used and as an average value might lie in a relative range of 40 micromicrofarads. In testing a group of similar transistors, by plotting a curve for one or several transistors, a single test for a given value of input capacitance and pyramiding factor could provide a rapid check as to whether a particular transistor lies within a permissible range of value.

While the subject is limited to junction type transistors operating in a grounded or common emitter configuration, it can readily be adapted to test NPN type transitors merely by changing the power supply and bias networks to be consistent with NPN transistors, since PNP and NPN transistors are essentially complements of each other. Using NPN transistors, a positive input transistion would then be applied to the base of the transistor and the corresponding output signal on the collector would be designated by a negative transition.

The above described testing method determines the ability of a transistor to drive peak current loads and indicates the best transistor for driving peak current at a given frequency, and in addition, it identifies the optimum value of input capacitance for switching circuits operated in a voltage mode. In testing the pyramiding factor of a transistor, a measure of the current amplification characteristics as well as the frequency response characteristics of the transistor can also be accomplished.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a system for testing the pyramiding factor of a transistor in a grounded emitter circuit configuration, the combination comprising a transistor having base, collector and emitter terminals, a variable input capacitor associated with said base terminal of said transistor, means for applying a signal transition having a predetermined duration to said base of said transistor, an output circuit including a load capacitance associated with said collector terminal, and means for adjusting said load capacitance until the transition of the output signal at said collector equals the transition of the input signal at said base, the ratio of said load capacitance to said input capacitance defining the pyramiding factor of said transistor.

2. The method of evaluating the ability of a transistor to switch capacitive load rapidly in a grounded emitter circuit configuration comprising the steps of connecting a capacitor in the input circuit of said transistor, applying a signal of predetermined magnitude and duration to the base of said transistor, connecting a variable capacitive load to the collector of said transistor and varying said capacitive load until the signal transition measured at the collector corresponds to a desired value.

3. A method according to claim 2 including the step of recording the ratio of load to input capacitance as a function of the input capacitance.

4. The method of evaluating the capacitive load switching ability of a transistor comprising the steps of simulating the input capacity of said transistor, applying a signal transition of predetermined duration through the input circuit to the base of said transistor, grounding the emitter of said transistor, simulating the load capacity of said transistor, measuring the duration of the output signal transition at the collector of said transistor and adjusting the duration of the output signal until it conforms to the desired output transition of said transistor, the ratio of load to input capacitance defining the capacitive load switching ability of said transistor.

5. Transistor testing apparatus for measuring the driving capability of a transistor connected in a grounded emitter circuit configuration comprising input and output circuits associated with said transistor, said input and output circuits being connected to the base and collector respectively of said transistor, said input and output circuits including capacitors for simulating the input and load capacitance of said transistor, means for applying a potential change having a predetermined transition time for the base of said transistor and means for adjusting the load capacitance until the transition time of said output signal equals that of the input signal, the ratio of load to input capacitance defining the pyramiding factor of said transistor.

6. The method of evaluating the capacitive switching ability of a transistor comprising the steps of simulating the input capacity of a transistor under test, simulating the load capacity of the transistor under test, applying a transition signal of predetermined duration to the input circuit of the transistor under test and adjusting said simulated load capacitance until the duration of the output transition equals a predetermined value.

7. The method of testing the pyramiding factor of a transistor comprising the steps of connecting an input circuit including a capacitor to the base of the transistor under test, grounding the emitter of said transistor under test, connecting an output circuit including a variable capacitor to the collector of the transistor under test, applying a signal having a predetermined duration to said input circuit and adjusting said variable capacitor until the duration of the output signal at said collector is equal to that of said input signal.

8. The method of evaluating the pyramiding factor of a transistor connected in a grounded emitter circuit configuration comprising the steps of connecting input and output circuits including input and load simulating capacitor to the base and collector respectively of said transistor, applying a signal transition to the base of said transistor, adjusting said load simulating capacitor until the transition of said output signal equals that of said input signal, varying said input capacitance and load capacitance while maintaining said output transition constant and recording the ratio of load to input capacitance as a function of input capacitance for various values of input capacitance.

References Cited in the file of this patent

UNITED STATES PATENTS 2,725,317 Kleimack -------------- Nov. 29, 1955